US010630636B1

(12) United States Patent
Heydari (10) Patent No.: US 10,630,636 B1
(45) Date of Patent: Apr. 21, 2020

(54) ANTI-CENSORSHIP FRAMEWORK USING MOVING TARGET DEFENSE SYSTEMS AND METHODS

(71) Applicant: Vahid Heydari, Huntsville, AL (US)

(72) Inventor: Vahid Heydari, Huntsville, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 298 days.

(21) Appl. No.: 15/478,846

(22) Filed: Apr. 4, 2017

Related U.S. Application Data

(60) Provisional application No. 62/338,665, filed on May 19, 2016.

(51) Int. Cl.
  *G06F 15/16* (2006.01)
  *H04L 29/12* (2006.01)
  *H04L 29/06* (2006.01)
  *H04W 80/04* (2009.01)

(52) U.S. Cl.
  CPC ...... *H04L 61/2007* (2013.01); *H04L 61/6059* (2013.01); *H04L 67/42* (2013.01); *H04W 80/04* (2013.01)

(58) Field of Classification Search
  None
  See application file for complete search history.

(56) References Cited

U.S. PATENT DOCUMENTS

| | | | |
|---|---|---|---|
| 7,142,971 | B2 | 11/2006 | Brown et al. |
| 7,152,238 | B1 | 12/2006 | Leung |
| 2003/0016655 | A1 | 1/2003 | Gwon |
| 2005/0008032 | A1 | 1/2005 | Yamamoto |
| 2007/0214501 | A1 | 9/2007 | Muramoto |
| 2008/0043739 | A1 | 2/2008 | Suh |
| 2009/0257401 | A1 | 10/2009 | Hirano |
| 2013/0212249 | A1 | 8/2013 | Groat et al. |
| 2016/0373405 | A1* | 12/2016 | Miller ................. H04L 63/0236 |

OTHER PUBLICATIONS

Lum, et al., "Teleoperation of a Surgical Robot Via Airborne Wireless Radio and Transatlantic Internet Links," Berlin, Heidelberg: Springer Berlin Heidelberg, pp. 305-314, 2008.

(Continued)

*Primary Examiner* — Padma Mundur
(74) *Attorney, Agent, or Firm* — Maynard Cooper & Gale, P.C.; Jon E. Holland (57) ABSTRACT

Systems and methods are provided to implement an anti-censorship framework that includes moving target defense systems and methods. The framework can be implemented at a web server hosting content that is intended to be accessed by one or more users. The web server can utilize dynamically changing IP addresses to avoid filtering and blocking (and also from being attacked) by censors. Users can be assigned to random groups and provided with a dynamic IP address of the web server that is unique for that group. After some time interval (called a shuffling interval), the web server can generate new sets of dynamic IP addresses and re-randomize the user groups and update the users with new IP addresses for the web server.

24 Claims, 7 Drawing Sheets

(56) References Cited

OTHER PUBLICATIONS

Manadhata, et al., "An attack surface metric," IEEE Transactions on Software Engineering, vol. 37, No. 3, pp. 371-386, May 2011.
Stavrou, et al., "Move: An end-to-end solution to network denial of service," Proceedings of the Internet Society (ISOC) Symposium on Network and Distributed Systems Security (SNDSS), pp. 1-16, Feb. 2005.
Wang, et al., "A moving target ddos defense mechanism," Computer Communications, vol. 46, pp. 10-21, 2014.
Wang, et al., "Catch me if you can: A cloud-enabled ddos defense," IEEE/IFIP Dependable Systems and Networks, pp. 264-275, 2014.
Danev, et al., "Enabling secure vm-vtpm migration in private clouds," in Proceedings of the 27th Annual Computer Security Applications Conference, pp. 187-196, 2011.
Zhang, et al., "Incentive Compatible Moving Target Defense against VM-Colocation Attacks in Clouds," Berlin, Heidelberg: Springer Berlin Heidelberg, pp. 388-399, 2012.
Okhravi, et al., "Creating a cyber moving target for critical infrastructure applications using platform diversity," International Journal of Critical Infrastructure Protection, vol. 5, No. 1, pp. 30-39, 2012.
Hong, et al., "Assessing the effectiveness of moving target defenses using security models," IEEE Transactions on Dependable and Secure Computing, vol. 13, No. 2, pp. 163-177, Mar. 2016.
Dunlop, et al., "Mt6d: A moving target ipv6 defense," AFCEA/IEEE MILCOM, pp. 1321-1326, 2011.
Morrell, et al., "Scaling ipv6 address bindings in support of a moving target defense," Internet Technology and Secured Transactions (ICITST), pp. 440-445, 2014.
Mathiesen, "Access to information as a human right," SRRN, pp. 1-20, Sep. 2008.
Dingledine, et al., "Tor: The second generation onion router," USENIX Security Symposium, pp. 1-17, 2004.
Stavrou, et al., "Move: an end-to-end solution to network denial of service," pp. 1-16, 2005.
Winter, et al., "How the great firewall of china is blocking tor," 2nd USENIX Workshop on Free and Open Communications on the Internet, pp. 1-7, 2012.
Moghaddam, et al., "Skypemorph: Protocol obfuscation for tor bridges," ACM Conference on Computer and Communications Security, pp. 1-13, 2012.
Weinberg, et al., "Stegotorus: A camouflage proxy for the tor anonymity system," ACM Conference on Computer and Communications Security, pp. 109-120, 2012.
Houmansadr, et al., "The parrot is dead: Observing unobservable network communications," IEEE Symposium on Security and Privacy, 66. 65-79, 2013.
Karlin, et al., "Decoy routing: Toward unblockable internet communication," USENIX Workshop on Free and Open Communications on the Internet, pp. 1-6, 2011.
Houmansadr, et al., "Cirripede: Circumvention infrastructure using router redirection with plausible deniability," ACM Conf. on Computer and Comm. Security, pp. 1-13, 2011.
Wustrow, et al., "TapDance: End-to-middle anticensorship without flow blocking," USENIX Security Symposium, pp. 159-174, 2014.
Wustrow, et al., "Telex: Anticensorship in the network infrastructure," USENIX Conference on Security, pp. 1-15, 2011.
Schuchard, et al., "Routing around decoys," ACM Conf. on Computer and Comm. Security, pp. 1-12, 2012.
Heydari, et al., "Scalable Anti-Censorship Framework using Moving Target Defense for Web Servers," IEEE Transactions on Information Forensics and Security, vol. 12, No. 5, pp. 1113-1124, May 2017.
Heydari, et al., "Anti-Censorship Framework using Mobile IPv6 based Moving Target Defense," Proc. ACM 11th Annual Cyber and Information Security Research, pp. 1-8, 2016.
Heydari, et al., "Securing Critical Infrastructure by Moving Target Defense," 11th International Conference on Cyber Warfare and Security, pp. 382-390, 2016.
Heydari, et al., "Secure VPN Using Mobile IPv6 Based Moving Target Defense," 2016 IEEE Global Communications Conference (GLOBECOM), pp. 1-6, 2016.
H. Soliman, "Mobile IPv6," Addison-Wesley, pp. 1-4, 2004.
Perkins, et al., "Mobility support in ipv6," Internet Requests for Comments, RFC 6275, pp. 1-169, Jul. 2011.
Gil, et al., "Multops: A data-structure for bandwidth attack detection," Proceedings of the 10th Conference on USENIX Security Symposium, vol. 10, pp. 1-12, 2001.
Hussain, et al., "A framework for classifying denial of service attacks," Proceedings of the 2003 Conference on Applications, Technologies, Architectures, and Protocols for Computer Communications, pp. 99-110, 2003.
Jafarian, et al., "Openflow random host mutation: Transparent moving target defense using software defined networking," Proceedings of the First Workshop on Hot Topics in Software Defined Networks, pp. 127-132, 2012.
Kaufman, et al., "Internet key exchange protocol version 2 (ikev2)," Internet Requests for Comments, pp. 1-142, Oct. 2014.
Thomson, et al., "Ipv6 stateless address autoconfiguration," Internet Requests for Comments, RFC 4862, pp. 1-30, Sep. 2007.
Johnson, et al., "Mobility support in ipv6," Internet Requests for Comments, RFC 3775, pp. 1-165, Jun. 2004.
C. Perkins, "Securing mobile ipv6 route optimization using a static shared key," Internet Requests for Comments, RFC 4449, pp. 1-7, Jun. 2006.
Nikander, et al., "Mobile ip version 6 route optimization security design background," Internet Requests for Comments, RFC 4225, pp. 1-37, Dec. 2005.
Narten, et al., "Neighbor discovery for ip version 6 (ipv6)," Internet Requests for Comments, RFC 4861, pp. 1-97, Sep. 2007.
Arkko, et al., "Enhanced route optimization for mobile ipv6," Internet Requests for Comments, RFC 4866, pp. 1-54, May 2007.
Wakikawa, et al., "Multiple care-of addresses registration," Internet Requests for Comments, RFC 5648, pp. 1-36, Oct. 2009.
Ebalard, "Mobile ipv6 ipsec route optimization (iro)," Working Draft, IETF Secretariat, Internet-Draft draft-ebalardmext-ipsec-ro-02, pp. 1-41, Jul. 2010, http://www.ietf.org/internet-drafts/draft-ebalard-mext-ipsec-ro-02.txt.
Zetter, "Hackers Could Commandeer New Planes Through Passenger Wi-Fi j Wired," http://www.wired.com/2015/04/hackers-commandeer-new-planes-passenger-wi-fi/, pp. 1-6, May 28, 2006.
"Cisco asa software ikev1 and ikev2 buffer overflow vulnerability," http://tools.cisco.com/security/center/content/CiscoSecurityAdvisory/cisco-sa-20160210-asa-ike, pp. 1-3, Aug. 5, 2016.
"Scapy," http://www.secdev.org/projects/scapy/, pp. 1-3, Oct. 4, 2015.
"D-itg | distributed internet traffic generator," http://traffic.comics.unina.it/software/ITG/, p. 1, Mar. 24, 2016.
"F-secure j switch on freedom," https://www.f-secure.com/en_US/welcome, pp. 1-2, Oct. 4, 2015.
"Free VPN service j free VPN software—hotspot shield VPN," http://www.hotspotshield.com/, pp. 1-3, Oct. 4, 2015.
"Psiphon j uncensored internet access for windows and mobile," https://psiphon3.com/en/index.html, p. 1, Oct. 4, 2015.
Heydari, et al., U.S. Appl. No. 15/461,099, entitled, "Systems and Methods for Preventing Remote Attacks Against Transportation Systems," filed Mar. 16, 2017.
Heydari, et al., U.S. Appl. No. 15/600,178, entitled, "Moving Target Defense Systems and Methods," filed May 19, 2017.

* cited by examiner

ANTI-CENSORSHIP FRAMEWORK USING MOVING TARGET DEFENSE SYSTEMS AND METHODS

CROSS-REFERENCE TO RELATED APPLICATIONS

This application claims the benefit of U.S. Provisional Application No. 62/338,665, entitled "Moving Target Defense Systems and Methods" and filed on May 19, 2016, which application is hereby incorporated by reference in its entirety.

BACKGROUND

The present application generally relates to an anti-censorship framework for a web server that utilizes moving target defense techniques.

The wide spread use of the Internet has reshaped all aspects of the way people live today. From political issues and economic trends to social relationships, the impact of having information available at one's fingertips has been far-reaching. Freedom of information (including the right to access information) is generally considered to be a fundamental human right guaranteed by most cultures and their respective laws. Nonetheless, many people around the world are not able to freely access information over the Internet, and their respective governments (or other independent groups) censor what the people can and cannot see and attempt to prevent people from accessing certain types of information.

Some common censorship techniques include: Internet Protocol (IP) address blocking; Domain Name System (DNS) filtering; Uniform Resource Locator (URL) filtering; packet filtering; and network disconnection. IP address blocking can include blocking access to certain web sites as identified by their IP addresses. In DNS filtering, certain domain names are not resolved, thereby preventing access. In URL filtering, URL strings can be scrutinized regardless of the domain name in the URL string. Packet filtering can include monitoring network packet payloads for forbidden terms. To avoid these censorship techniques, users can utilize encrypted tunnels and proxies, such as virtual private networks (VPNs), open HTTPS proxies and Tor. In response to these censorship avoidance techniques, the censoring entity typically attempts to find and block the hosts of these services thereby limiting their effectiveness. Network disconnection can be an extreme censorship technique and can include turning off the network infrastructure to achieve censorship goals. Complete network disconnection is seldom implemented in practice, but there are no solutions to this censorship technique other than finding another way to get on to the Internet.

SUMMARY

The present application generally pertains to an anti-censorship framework that incorporates features from Mobile IPv6 (MIPv6) and moving target defense (MTD) systems and methods. The framework can be implemented at the web servers hosting the content that is intended to be freely accessed by people. The web servers can be treated as mobile nodes and utilize dynamically changing IP addresses (also referred to as care-of addresses (CoAs)) to avoid filtering and blocking (and also from being attacked) by censoring entities. End-users can be assigned to random groups and provided with a CoA for the web server that is associated with a particular group. The users can use the CoA for the web server associated with their group to access the content hosted by the web server. After some time interval (called a shuffling interval), the web server can generate new sets of CoAs and re-randomize the user groups and update the users with the new CoAs for the web server.

One advantage of the present application is the use of randomly generated, dynamic CoAs to thwart IP address blocking.

Another advantage of the present application is the use of Internet Protocol Security (IPsec) to block packet inspection.

Still another advantage of the present application is that no modifications to the existing MIPv6 standard/protocol are required.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

The present application generally pertains to systems and methods for implementing an anti-censorship framework at a web server (information purveyor) using moving target defense techniques. The anti-censorship framework can place the client computers communicating with the web server in access groups and then provide each access group with a dynamic IP address (care-of address) for the web server that the client computers in the access group can use to access the web server. After a predetermined shuffling interval has lapsed, the client computers can be reassigned to new access groups, which are then provided with new dynamic IP addresses for the web server. By continuously changing the IP addresses used by the client computers to access the web server, a censor attempting to block access to that web server may only have limited success. For example, a censor can only block access to the web server (by blocking the IP address of the web server) for only the client computers that are in the same access group as the censor or received the same IP address from the web server as the censor. The remaining client computers in the other access groups can still access the web server because other client computers are using different IP addresses to access the web server. In addition, after the expiration of the shuffling interval, the client computers that were blocked from accessing the web server by the censor can be placed into a new access group and receive a new IP address for the web server. Once the previously blocked client computers receive the new IP address for the web server, the client computers can resume access to the web server.

In addition, the anti-censorship framework can be used to identify censors and separate the censors from the client computers that are attempting to access the web server. A credit system can be used for the client computers (and the censors) that access the web server to organize the client computers into larger groups that can be more easily managed and to identify the censors. As the web server shuffles dynamic IP addresses, the client computers that are using IP addresses that are not blocked by a censor can increase their "credit." Once a client computer has earned enough credit, the client computer can be combined into a larger group with other similar client computers. The shuffling interval used by the web server for the larger group of the client computers can be much larger than a shuffling interval used for a smaller group of the client computers. The large shuffling interval used with the group of client computers having more "credit" reduces the burden on the web server since the client computers having more "credit" are perceived as more trustworthy by the web server.

In contrast, if an IP address is blocked for a group of client computers (which group probably includes a censor) then the "credit" for the client computers (and censor) is reduced. The group of client computers using the blocked IP address is then divided into smaller groups, each of which receives a different IP address for the web server. The process of determining if an IP address is blocked and reducing the size of the groups that have blocked IP addresses can be used to identify censor and thereby take corresponding action to reduce the effectiveness of the censor. Once the censor is identified the client computers can resume accessing the web server.

Figure 1:
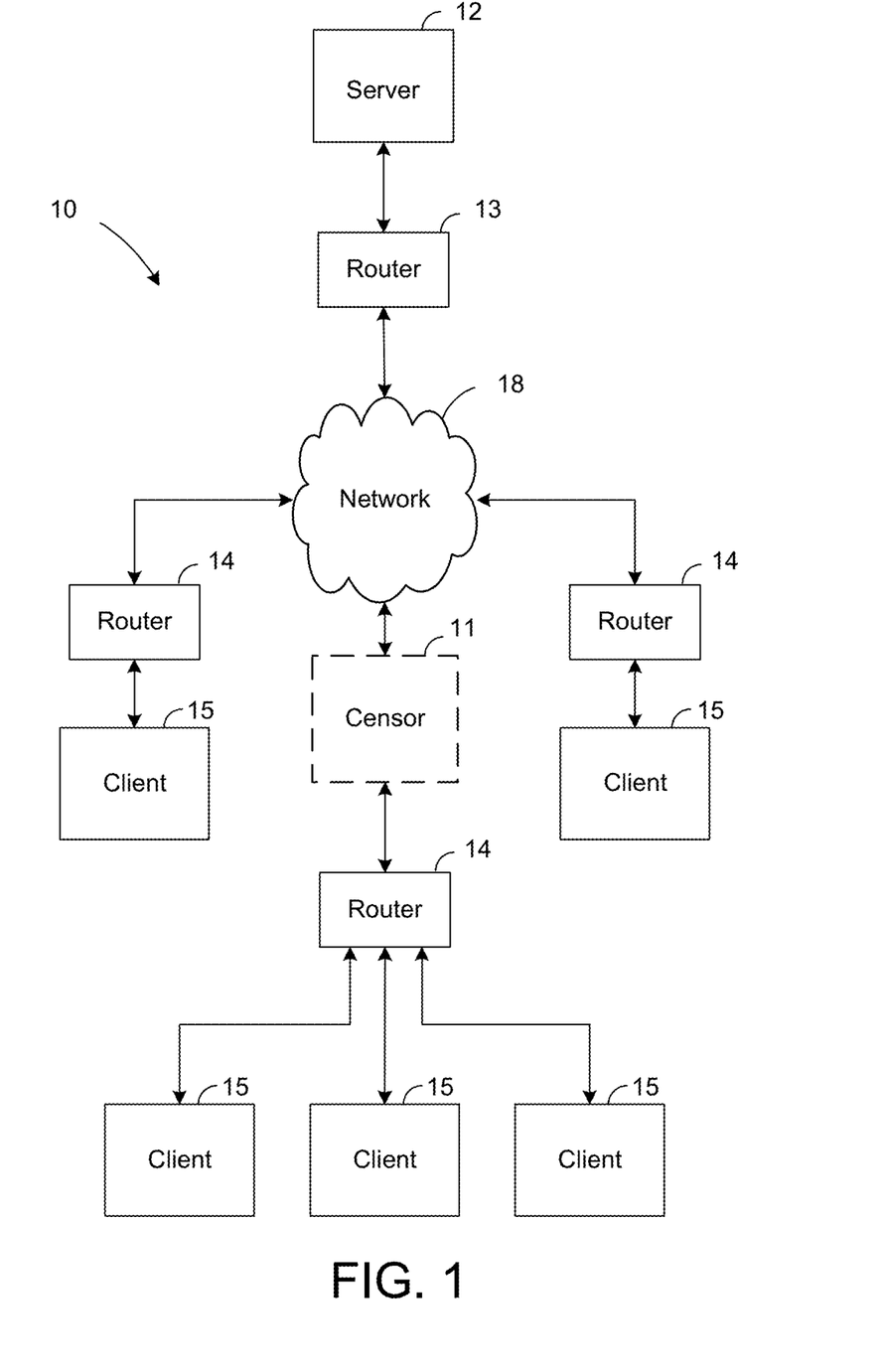
FIG. 1 shows a block diagram of an embodiment of a computer network.

FIG. 1 shows an embodiment of a computer network 10. The network 10 includes a server computer 12 in communication with one or more client computers 15 over a network 18. Each client computer 15 is communicatively coupled to the network 18 by a router 14 to exchange, i.e., send and receive, instructions, data and/or information with the server computer 12. The client computers 15 can be coupled to the routers 14 and the routers 14 can be coupled to the network 18. Each router 14 can be coupled to one or more client computers 15 and provide a communication path from the client computer 15 to the network 18. Similarly, the server computer 12 can be coupled to a router 13 that is coupled to the network 18. In other embodiments, one or more of the server computer 12 and the client computers 15 may be coupled directly to network 18 without using a router 13, 14.

In one embodiment, the client computers 15 can be, but are not limited to, a desktop, laptop or tablet computer, a hand-held device, such as a cellular telephone (e.g., smartphone) or portable gaming device, a television, a video game system, a still and/or video camera, an attachable, wearable, implantable or non-invasive computer or device, and/or a smart thing. In another embodiment, the client computers 15 can be a programmable logic controller (PLC) or a Human Machine Interface (HMI) of Supervisory Control And Data Acquisition (SCADA) systems. The client computers 15 can each have one or more input devices to permit a user to enter instructions, data and/or information for communication over network 18 and one or more output devices to permit the user to display instructions, data and/or information received over the network 18. In an embodiment, the network 18 can be the Internet and use the transmission control protocol/Internet protocol (TCP/IP) to communicate over the network 18. However, in other embodiments, the network 18 may be an Intranet, a local area network (LAN), a wide area network (WAN), a Near Field Communication (NFC) Peer to Peer network, Internet of Things, or any other type of communication network using Internet protocol.

In some embodiments, a portion of the computer network 10 may include one or more censors 11 coupled to the network 18. The censors 11 can be used to detect for and block access to web sites, information or other services provided by the server computer 12 that are determined (in the view of the censor 11) to be inappropriate or unauthorized for the client computers 15. Once the censors 11 have determined that information is inappropriate for the client computers 15, the censors 11 can prevent the client computers 15 from accessing the server computer 12 and the corresponding information provided by the server computer 12. The censor 11 can be located between the network 18 and a router 14 for the client computers 15 as shown in FIG. 1. However, in other embodiments, the censors 11 can be located elsewhere in the computer network 10 and may appear as a client computer 15 (e.g., coupled to a router 14). To prevent the censors 11 from restricting access to the server computer 12, the server computer 12 can incorporate an anti-censorship framework.

Figure 2:
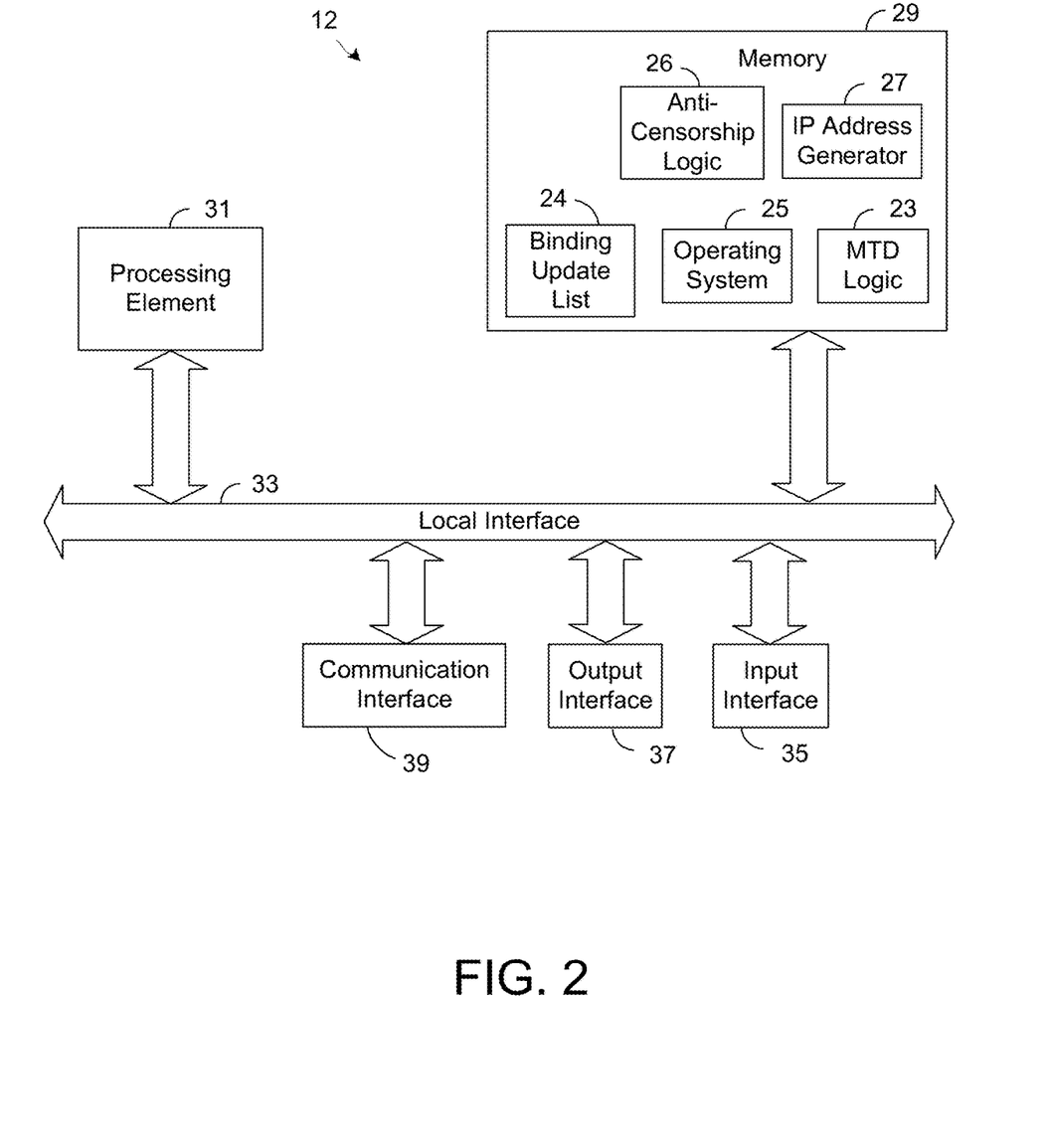
FIG. 2 shows a block diagram of a server computer from the computer network of FIG. 1.

FIG. 2 depicts an embodiment of the server computer 12. The server computer 12 may be any device capable of processing and communicating data, such as a personal computer (e.g., a desktop or laptop) a hand-held computing device (e.g., a personal digital assistant (PDA), cellular telephone, tablet computer, portable gaming device or a still and/or video camera), a television, a video game system, an attachable, wearable, implantable or non-invasive computer or device, and/or a smart thing. In another embodiment, the server computer 12 can be a programmable logic controller (PLC) or a Human Machine Interface (HMI) of Supervisory Control And Data Acquisition (SCADA) systems.

The server computer 12 has an operating system 25 for generally controlling the operation of the server computer 12. The server computer 12 also has MTD (moving target defense) logic 23 that operates in conjunction with the operating system 25 to control the IP (Internet protocol) addresses used by the server computer 12 when communicating over network 18. The MTD logic 23 can use random IP addresses generated by the IP address generator 27. The server computer 12 can further have anti-censorship logic 26 to prevent attempts by censors 11 to restrict access to the server computer 12. The operating system 25, MTD logic 23, anti-censorship logic 26 and IP address generator 27 can be implemented in software, hardware, firmware or any combination thereof. In the server computer 12 shown by FIG. 2, the operating system 25, MTD logic 23, anti-censorship logic 26 and IP address generator 27 can be implemented in software and stored in memory 29. Note that the operating system 25, MTD logic 23, anti-censorship logic 26 and IP address generator 27, when implemented in software, can be stored and transported on any computer-readable medium for use by or in connection with an instruction execution apparatus that can fetch and execute instructions. In one embodiment, the operating system 25 can be Microsoft Windows, Apple OS X, Linux, Android, iOS or any other similar type of operating system that control the server computer 12 and communicate over network 18. Additional information regarding the operation of the MTD logic 23 and IP address generator 27 can be found in U.S. Provisional Application No. 62/338,665, entitled "Moving Target Defense Systems and Methods" and filed on May 19, 2016, which application is incorporated herein by reference in its entirety.

The server computer 12 has at least one conventional processing element 31, which has processing hardware for executing instructions stored in memory 29. As an example, the processing element 31 may include a central processing unit (CPU) or a digital signal processor (DSP). The processing element 31 communicates to and drives the other elements within the server computer 12 via a local interface 33, which can include at least one bus. Furthermore, an input interface 35, for example, a keypad, keyboard or a mouse, can be used to input data from a user of the server computer 12, and an output interface 37, for example, a printer, monitor, liquid crystal display (LCD), or other display apparatus, can be used to output data to the user. Further, a communication interface 39, such as at least one modem, may be used to communicate with the router 13 and/or network 18.

The MTD logic 23 can be used to prevent a censor 11 from blocking access to the server computer 12 by providing dynamic IP addresses for the server computer 12. In one embodiment, the MTD logic 23 can be based on Mobile IPv6 (Internet Protocol version 6), which results in the server computer 12 acting like a mobile node even though the server computer 12 may not move. The MTD logic 23 uses a home address of the server computer 12 to be the permanent IP address of the server computer 12 and a plurality of care-of address for the server computer 12 to be the dynamic IP addresses provided to the client computers 15. The permanent IP address (home address) of the server computer 12 can be used to avoid disrupting TCP sessions in an embodiment. In one embodiment, the home address of the server computer 12 can be assigned an IP address that is different from any possible care-of address that the server computer 12 may use. For example, the IP address of the home address for the server computer 12 can have a prefix that is different from a subnet received by the server computer 12 from a route advertisement message. By receiving a different prefix in the route advertisement message, the server computer 12 can think it is in a foreign network and can register a care-of address in the network 18. Only the care-of addresses of the server computer 12 can be accessible by the client computers 15. The IP address generator 27 is used to dynamically rotate or change the care-of addresses of the server computer 12 for the MTD logic 23. The use of the home address as the permanent address for the server computer 12 can provide transparency to applications operating on the server computer 12. In addition, since the server computer 12 can be connected to the network 18 via router 13, the home address is not accessible through the network 18. The only accessible IP addresses of the server computer 12 are the care-of addresses which are rotated or changed randomly and dynamically.

The MTD logic 23 (through Mobile IPv6) enables the client computers 15 to cache the binding of the server computer's permanent IP address with its dynamic IP addresses (the care-of addresses) and then send any packets destined for the server computer 12 directly to the server computer 12 using the dynamic IP addresses. A binding update mechanism/process can be used to inform client computers 15 of the dynamic IP addresses of the server computer 12. The client computers 15 can use the new dynamic IP addresses from the server computer 12 only after receiving the new IP address in a binding update message from the server computer 12, which has registered the new dynamic IP addresses.

As part of the registration process discussed above, the server computer 12 is connected to network 18 and the MTD logic 23 can create care-of addresses for the server computer 12, based on information received in a route advertisement message from the router 13 connected to the server computer 12, using the stateless address auto configuration of IPv6. The MTD logic 23 can then bind the care-of addresses for the server computer 12 to the home address for the server computer 12. Once the binding of the home address and the care-of addresses is complete, the server computer 12 should not be accessible by the home address. Thus, a new client computer 15 cannot have access to the server computer 12 by the server computer's home address.

The MTD logic 23 can then start the route optimization process by sending a packet from the server computer 12 to each client computer 15 using a static shared key method. In one embodiment, the server computer 12 can send a binding update message to each client computer 15 and wait to receive a corresponding binding acknowledgement message from each client computer 15. In another embodiment, the MTD logic 23 can use IPsec with Internet Key Exchange (IKE) when communicating between the server computer 12 and client computers 15.

Figure 3:
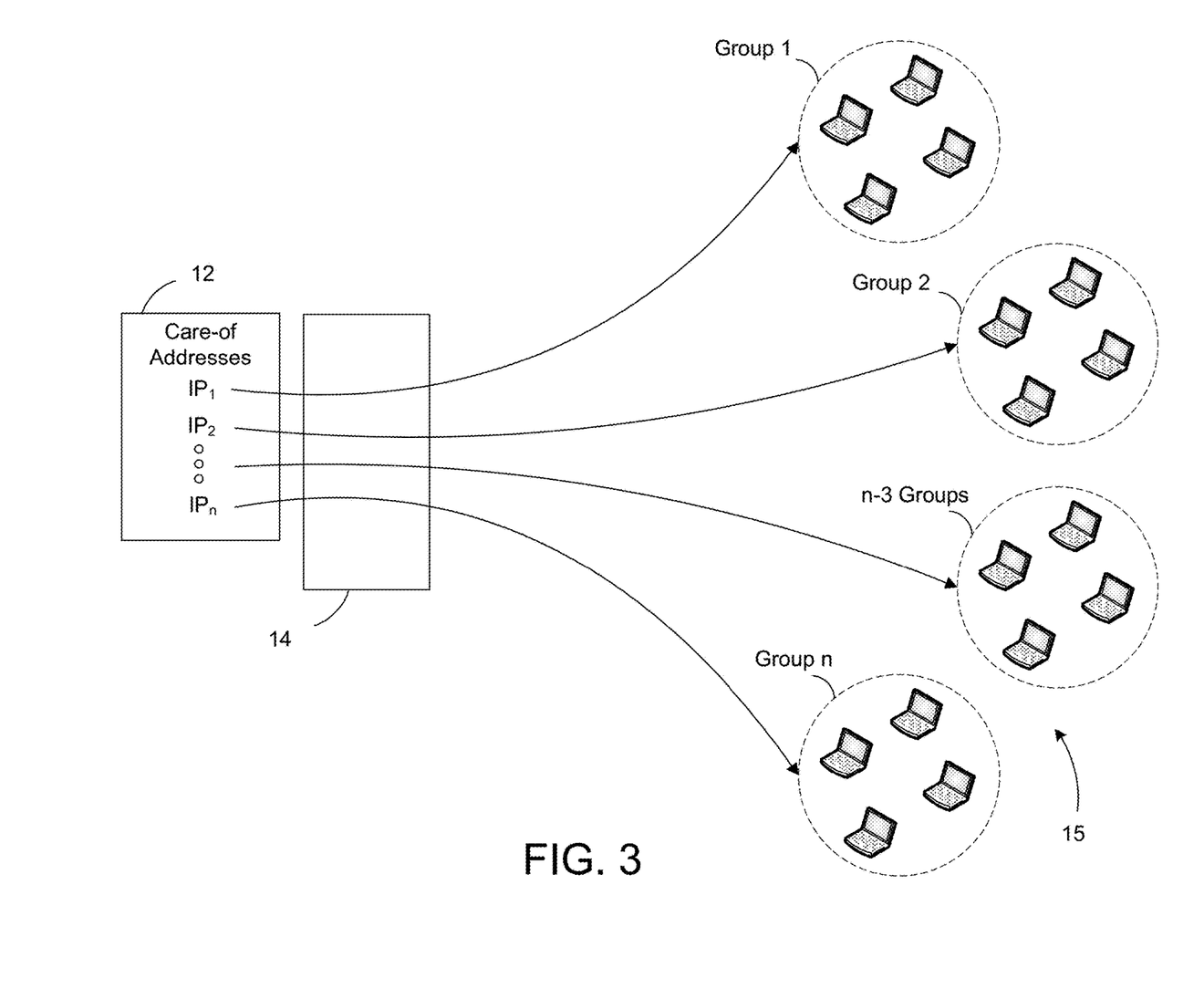
FIG. 3 shows a block diagram of an embodiment of the server computer providing care-of addresses to groups of client computers.

The anti-censorship logic 26 can be used to organize or arrange the client computers 15 into a plurality of groups (sometimes referred to as access groups). Each of the groups generated by the anti-censorship logic 26 can include one or more client computers 15. The anti-censorship logic 26 works with the MTD logic 23 and the IP address generator 27 to generate unique care-of addresses for the server computer 12 that can be assigned to each of the groups. As shown in FIG. 3, the server computer 12 can generate n IP addresses or care-of addresses ($IP_1$-$IP_n$) for the n groups of client computers 15 and provide one of the generated IP addresses to each of the groups. After a predetermined time interval (sometimes referred to as a shuffling interval), the anti-censorship logic 26 can generate new groups for the client computers 15 (with each newly generated group having at least one different client computer 15 included in the group) and new care-of addresses for each of the groups that are subsequently provided to the client computers 15 in the corresponding groups.

Figure 4:
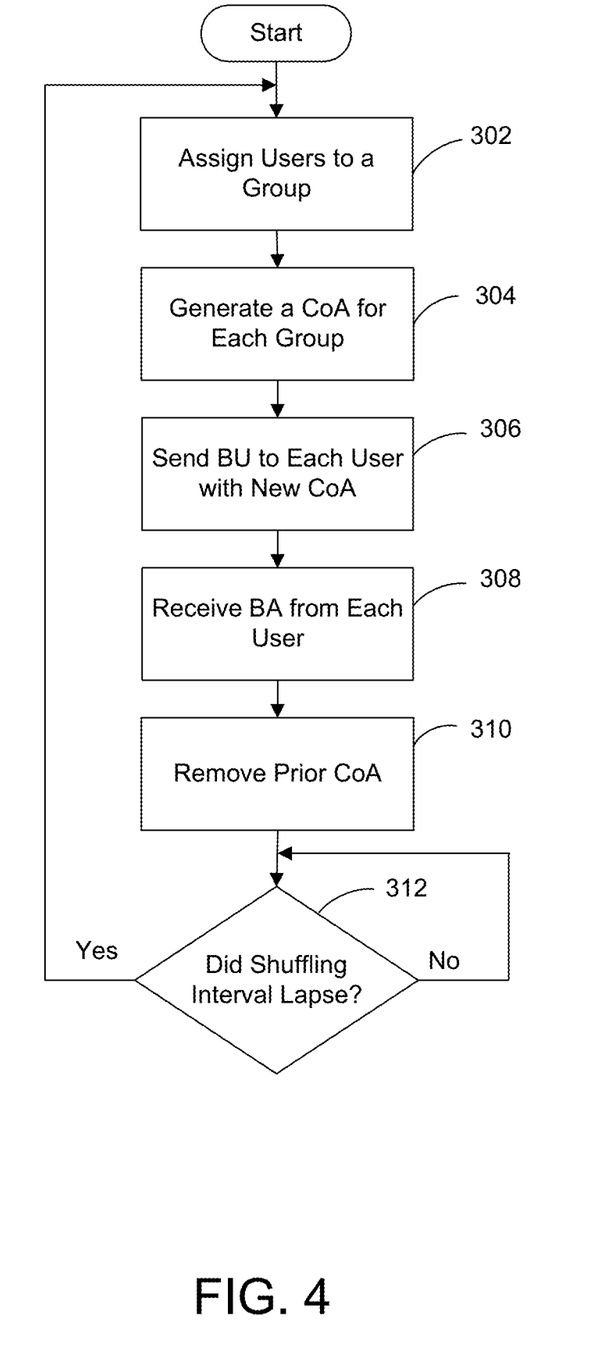
FIG. 4 is a process diagram showing an embodiment for generating care-of addresses and groups for the client computers of FIG. 3.

FIG. 4 shows an embodiment of a process for generating care-of addresses and groups for the client computers 15. The process begins with the anti-censorship logic 26 assigning each of the users (e.g., client computers 15) communicating with the server computer 12 into a group (step 302). The anti-censorship logic 26 can determine the number of groups that are used and can assign each of the users into one of the groups. In one embodiment, the number of groups used by the anti-censorship logic 26 may be a predetermined number of groups (e.g., 50 groups) and does not consider the number users communicating with the server computer 12. In another embodiment, the number of groups used by the anti-censorship logic 26 can be based on the number of users communicating with the server computer 12. For example, the anti-censorship logic 26 may only use a few groups when the number of users is low and a larger number of groups when the number of users is higher. In addition, the anti-censorship logic 26 can assign users into groups such that the numbers of users in each group is substantially balanced (e.g., substantially equal) in one embodiment. However, in other embodiments, the anti-censorship logic 26 can assign users into groups such that the groups are unbalanced (e.g., one or more groups may have significantly more or less users than the other groups).

After assigning each of the users communicating with the server computer 12 to a group, the anti-censorship logic 26 can work with the MTD logic 23 and the IP address generator 27 to generate a CoA (care-of address) for each of the groups (step 304). The IP address generator 27 can randomly generate a new IP address to be used as the CoA of the server computer 12 for each of the groups. In one embodiment, the IP address generator 27 can create a random 64 bit address and combine the randomly created address with the highest significant 64 bits of the current CoA for a group to generate the new CoA for a group. In other embodiments, the random portion of the new CoA and the highest significant bits portion of the new CoA can be of different bit lengths depending on the size of the CoA and the desired amount randomness to be incorporated into the new CoA.

The new CoA for each of the groups can then be checked to determine if it is unoccupied, i.e., available, by sending a neighbor solicitation message before registering the new CoA for the client computers 15 in the group in the binding update list 24 (see FIG. 2). The MTD logic 23 can then detect if an address collision occurred, i.e., the new CoA is being used by another device. If an address collision occurred, the process returns to step 304 for a new CoA for that group. If no collision is detected, then the new CoA can be registered in the binding update list 24 for the client computers 15 in that group. In one embodiment, the binding update list 24 can also store the prior CoA assigned to the client computers 15 in the group. The MTD logic 23 can then send a binding update (BU) message (step 306) to the users or client computers 15 of the corresponding group to inform the client computers 15 of the new CoA for the server computer 12. When each user receives the binding update message, the home address and the CoA of the server computer 12 are inserted into a binding cache of the user or client computer 15. The client computers 15 can then send a binding acknowledgement (BA) message to the server computer 12, notifying the server computer 12 that the client computers 15 have been informed of the new CoA (step 308). In one embodiment, the MTD logic 23 can use a static shared key during the binding update procedure. In another embodiment, the MTD logic 23 can use Internet Protocol Security (IPsec) with Internet Key Exchange (IKE) during the binding update procedure. Both security methods may also be used for transmitting data packets between the server computer 12 and the client computers 15.

After the server computer 12 receives the binding update message from a client computer 15, the server computer 12 can remove the previous CoA stored in the binding update list 12 for the client computer 15 (step 310). By maintaining the prior CoA (for the server computer 12) provided to the client computer 15 in the binding update list 24, the client computer 15 can continue to communicate with the server computer 12 during the binding update process.

Next, a determination is made as to whether a shuffling interval has lapsed (step 312). If the shuffling interval has not lapsed, the server computer 12 continues to communicate with the client computers 15 using the information in the binding update list 24. Once the shuffling interval has lapsed or expired, the process returns to step 302 for the assignment of new groups and the generation of care-of addresses to be provided to the client computers 15. In one embodiment, the shuffling interval can range from shorter time periods such as 5 or 10 seconds (down to about 2 seconds) to longer time periods such as 1 or 2 minutes (or greater) depending on the activity at the server computer 12.

In one embodiment, when one of the client computers 15 is rebooted, the client computer 15 only needs to wait for the next binding update message from the server computer 12 before communicating with the server computer 12. After that time, the client computer 15 can have access to the server computer 12 since it has the proper CoA for the server computer 12 from the binding update message.

A new user or client computer 15 cannot start a connection to the server computer 12 using the home address of the server computer 12. Instead, the connection has to be initiated by the server computer 12 upon receiving a request from the user or client computer 15. On the user side, a host file can be set using the home address and domain name of the server computer 12. To initiate a connection from a new user or client computer 15 to the server computer 12, the user must send its IP address and a shared key to the server computer 12. In one embodiment, the new client computer 15 has to contact the server computer 12 using an out-of-band request (e.g., email, webpage, etc.) and the server computer 12 initiates the connection setup. In one embodiment, an uncensored website (i.e., a friendly server) can be used to facilitate the connection between users and the server computer 12. For example, the uncensored website can include a window on its main page that permits a user to enter an IPv6 address and key information. The uncensored website can then send the IPv6 address and the key information to the server computer 12. The server computer 12 can then use the standard MIPv6 procedure to start the route optimization mechanism and update the user (e.g., the new client computer 15) with one of its active CoAs. To determine whether the user is human or an automated bot, the uncensored website can include one or more challenge puzzles that requires significant human intervention (e.g., a CAPTCHA test) before accepting the IPv6 address or the key information of the user. During the authentication process, the MTD logic 23 can check the binding update list 24 before sending the packet to the client computer 15. The address of the new client computer 15 should not be found in the binding update list 24, so the MTD logic 23 can automatically start the route optimization mechanism to the new client computer 15.

To combat a censoring entity's use of large-scale automated censor operation (e.g., the use of lots of sensors 11), the registration method can make it difficult for both a human and a computer to solve the challenge puzzles within a certain time window. In one embodiment, a sequence of challenge puzzles can be used with random down times (i.e., the time the user waits for the next puzzle to come up), and a short time window for clicking on the puzzle. A random screen location for each subsequent puzzle can also be used to prevent automatic clicking after the first human click. Changing the number of puzzles in the sequence and the random down time for each puzzle can be used to define the required registration time. The registration process can be configured such that the users are reset after a certain amount of time (e.g., once a day). In this way, a large-scale automated censor operation requires significant human resources to operate.

Figure 5:
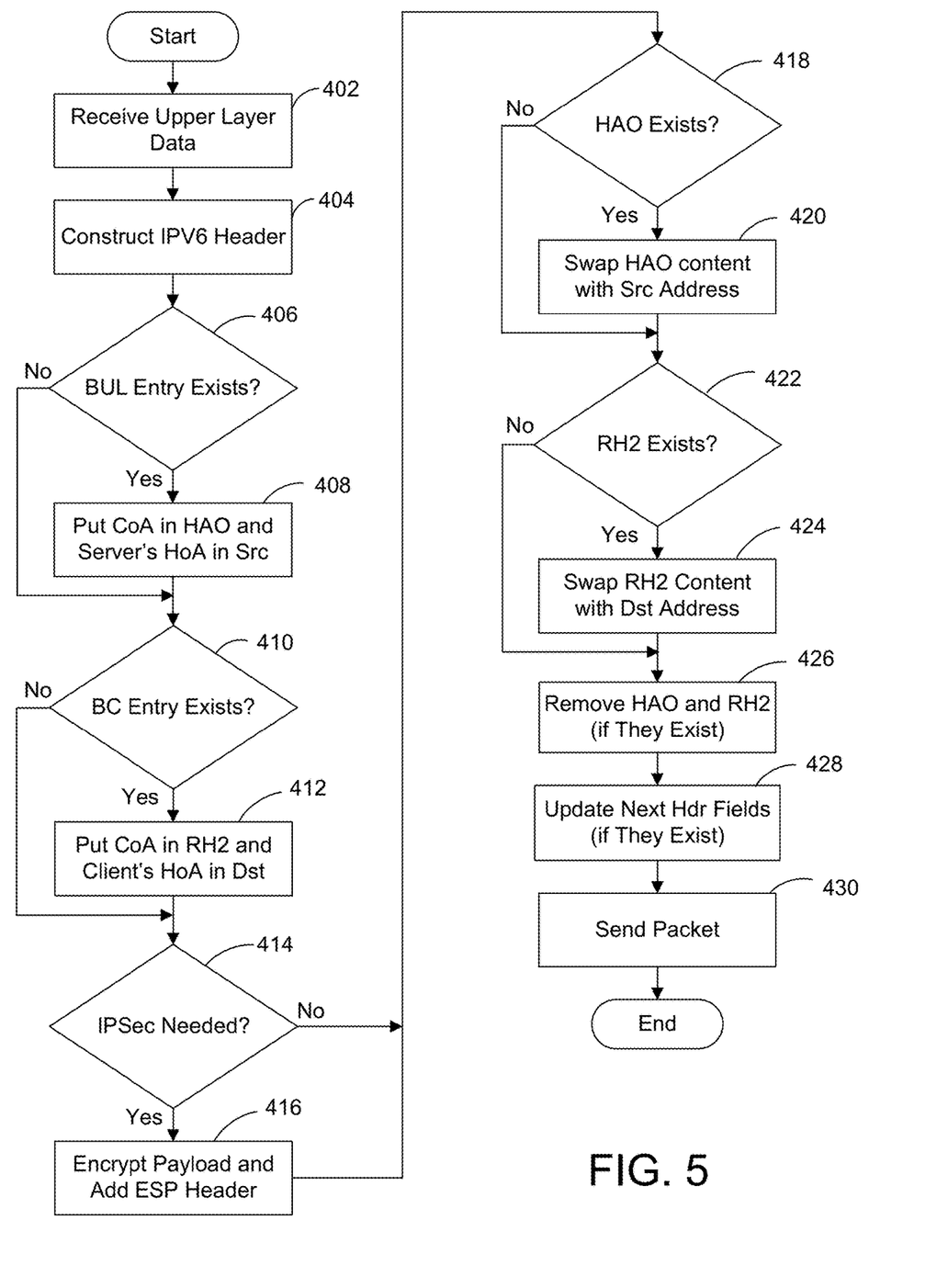
FIG. 5 is a process diagram showing an embodiment for preparing a packet at the server computer from the computer network of FIG. 1.

To prevent censoring based on addresses in the type 2 routing header (RH2) or the home address option (HAO), the destination option header and the type 2 routing header can be removed from all packets. The Security Parameter Index (SPI) found in the IP Encapsulating Security Payload (ESP) header is sufficient to get access to the home address information (the real source/destination of the packet). FIG.

Figure 6A:
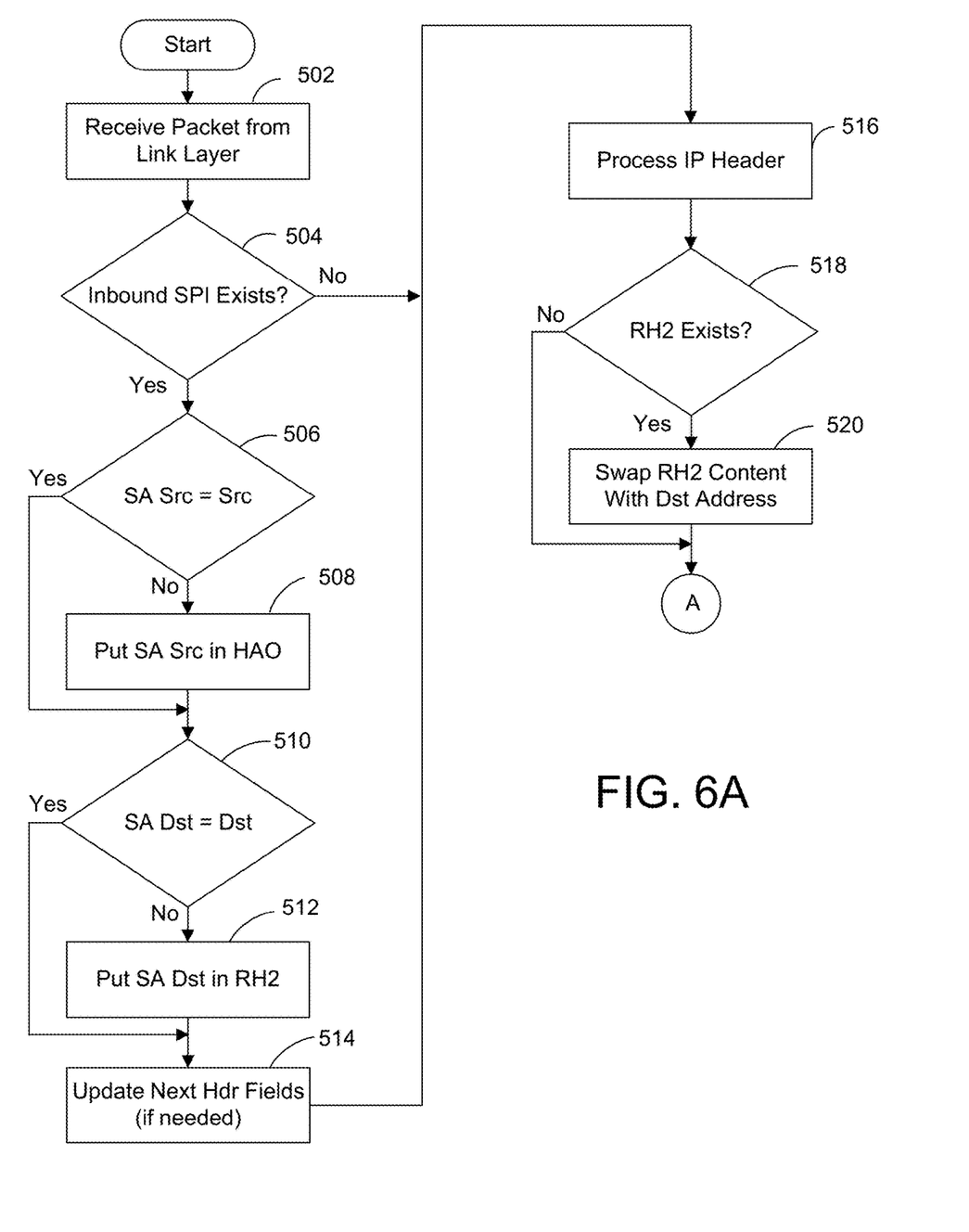
FIGS. 6A and 6B are a process diagram showing an embodiment for processing a packet received at a client computer 15 from the computer network of FIG. 1.
Figure 6B:
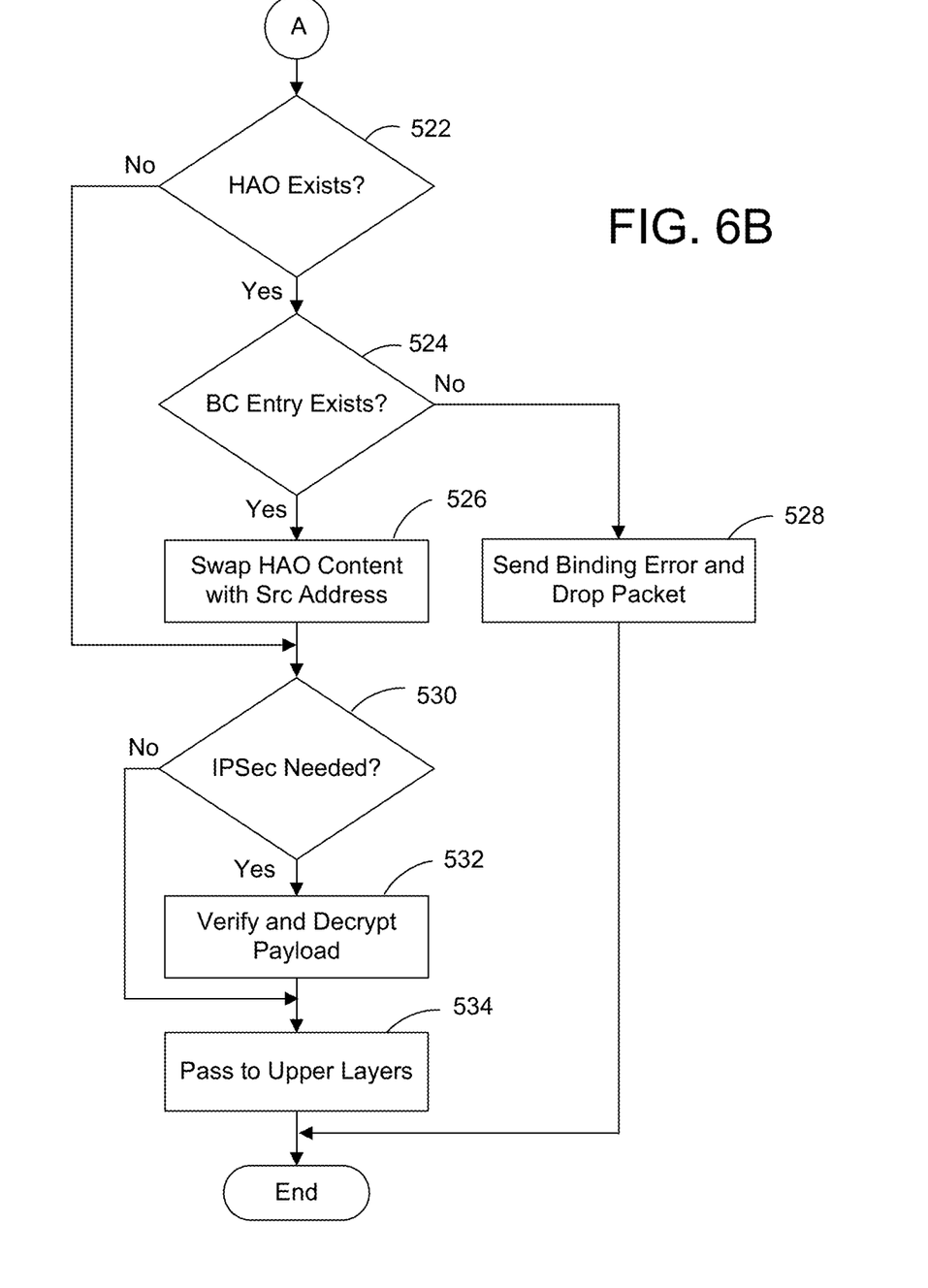

5 shows an embodiment of a process for preparing a packet at the server computer 12. FIGS. 6A and 6B show an embodiment of a process for processing a packet received at the client computer 15.

FIG. 5 shows an embodiment of a process for preparing a packet at the server computer 12 to send to a client computer 15. The process begins with the server computer 12 receiving upper layer data (step 402). The server computer 12 can then construct an IPv6 header (step 404). The server computer 12 can then determine if an entry for the client computer 15 receiving the packet is in the binding update list (BUL) 24 (step 406). If there is an entry for the client computer 15 in the binding update list 24, then the server computer 12 can put the CoA for the server computer 12 in the HAO and the home address for the server computer 12 in the source address (Src) (step 408).

After placing the CoA for the server computer 12 in the HAO and the home address for the server computer 12 in the Src (or if there was no entry in the binding update list 24), the process can then determine if an entry for the client computer 15 is in a binding cache (BC) of the server computer 12 (step 410). If there is an entry for the client computer 15 in the binding cache, then the server computer 12 can put the CoA for the server computer 12 in the type 2 routing header (RH2) and the home address for the client computer 15 in the destination address (Dst) (step 412). After placing the CoA for the server computer 12 in the RH2 and the home address for the client computer 15 in the Dst address (or if there was no entry in the binding cache), the process can then determine if IPSec is needed (step 414).

If there is a need for IPSec, then the server computer 12 can encrypt the payload of the packet and add an ESP Header (step 416). After encrypting the payload and adding the ESP header (or if there was no need for IPSec), the process can then determine if an HAO exists (step 418) in the header for the packet to be sent by the server computer 12. If there is an HAO, then the server computer 12 can swap the HAO content for the Src address (step 420). After swapping the HAO content with the Src address (or if there was no HAO), the process can then determine if an RH2 exists in the header for the packet to be sent by the server computer 12 (step 422). If there is an RH2, then the server computer 12 can swap the RH2 content for the Dst address (step 424). After swapping the RH2 content with the Dst address (or if there was no RH2), the server computer 12 can the remove one or both of the HAO or the RH2 (if present) from the header of the packet to be sent by the server computer 12 (step 426). The server computer 12 can then update the next header (Hdr) fields (if present) (step 428) to account for the removal of the HAO and/or the RH2 from the packet. The server computer 12 can then send the packet (step 430) to the client computer 15 and the process ends.

FIGS. 6A and 6B show an embodiment of a process for processing a packet received at the client computer 15. The process begins with the client computer 15 receiving the packet from the link layer (step 502). The client computer then determines if the packet includes an inbound SPI (step 504). If the packet includes an inbound SPI, then a determination is made as to whether the security association (SA) source address (SA Src) matches the Src address in the packet (step 506). If the SA Src does not match the Src address, then the client computer 15 can place the SA Src in the HAO (step 508). After placing the SA Src in the HAO (or if the SA Src matched the Src address), the process can then determine if the SA destination address (SA Dst) matches the Dst address in the packet (step 510).

If the SA Dst does not match the Dst address, then the client computer 15 can place the SA Dst in the RH2 (step 512). After placing the SA Dst in the RH2 (or if the SA Dst matched the Dst address), the client computer 15 can then update the next header (Hdr) fields (if present) (step 514) to account for the placing of information in the HAO and/or the RH2. After updating the next Hdr fields (or if there was no inbound SPI), the client computer 15 can then process the IP header (step 516). The process can then determine if an RH2 exists in the header for the packet received from the server computer 12 (step 518). If there is an RH2, then the client computer 15 can swap the RH2 content with the Dst address (step 520). After swapping the RH2 content with the Dst address (or if there was no RH2), the process can then determine if an HAO exists (step 522) in the header for the packet received from the server computer 12. If there is an HAO, then the client computer 15 can determine if an entry for the server computer 12 is in a binding cache (BC) of the client computer 15 (step 524). If there is no entry for the server computer 12 in the BC of the client computer 15, the client computer 15 can send a binding error message to the server computer 12 and drop the packet (step 528). If there is an entry for the server computer 12 in the BC of the client computer 12, the client computer 12 can swap the HAO content with the Src address (step 526). After swapping the HAO content with the Src address (or if there was no HAO), the client computer 15 can then determine if IPSec is needed (step 530). If IPSec is needed, then the client computer 15 can verify and decrypt the payload of the packet (step 532). After decrypting the payload (or if there was no need for IPSec), the process can then pass the packet to the upper layers (step 534) and the process ends.

In one embodiment, some changes can be made to the implementation of MIPv6 at the server computer 12 to (1) permit the allocation of users (or client computers 15) to different access groups and (2) update each group by its allocated CoA. No changes are needed at the client computers 15, and the MIPv6 protocol/standard is also not changed. Allocating different CoAs to each group limits the impact of having a censor 11 (e.g., a censoring entity who may be pretending to be a user) within a group. Once a censor 11 discovers a CoA, the sensor 11 can utilize IP blocking to cut-off access to the server computer 12 that may occur via the discovered CoA. All users (or client computers 15) that are in the same group as the censor 11 would lose their connection to the server computer 12. To alleviate the problem of lost connectivity, the shuffling of groups and CoAs is used and each user is randomly rotated through a different group during each shuffling interval.

To eliminate packet loss during address shuffling, the server computer can send a BU message for its new CoAs before removing the previous CoAs. Therefore, during the handoff delay, any packets sent by users (or client computers 15) using the old CoA in the header can still be received by the server computer 12. Each of the previous CoAs can be removed by the server computer 12 after receiving the respective BAs from all the users in each group or after a certain amount of time. While the shuffling interval can be a static value (i.e., a value that does not change with each interval), the shuffling interval can be a dynamic value (i.e., a value that can change with each interval) in some embodiments. Dynamic shuffling intervals may be utilized to decrease any potential overhead associated with the binding update mechanism.

The censoring entity may attempt to circumvent the anti-censorship framework by blocking the entire subnet for a server computer 12. To address the blocking of a subnet, a coalition amongst web content providers and/or network domain operators can be formed such that web server mirrors can be placed in various subnets in conjunction with other unblocked content (that is desirable to the censoring entity). The participation of the friendly domain (e.g., an uncensored entity) to avoid censoring is relatively cheap compared to ISP participation in other methods (e.g., decoy-routing).

In another embodiment, the anti-censorship framework can be modified to reduce the number of CoAs used by the server computer 12 and to use a dynamic shuffling interval. To use the modified anti-censorship framework, the users or client computers 15 can be grouped according to the country that they are located in (the location information can be obtain by prefix of IPv6) and the server computer 12 can check its IP addresses (CoAs) by sending ping commands to predefined innocent agents (or some webservers) in the same country as users or client computers 15 that received the IP address or CoA. If a response is not received to the ping command, the server computer 12 can determine that the IP address or CoA is blocked by censors 11. In other words, the server computer 12 can perform behavior monitoring to determine if a censor 11 is blocking an IP address.

When performing behavior monitoring, the server computer 12 can assign a default credit (C) of 0 to each new user. After each shuffling interval, the server computer 12 checks each of the IP addresses or CoAs used to determine whether or not the IP addresses have been blocked by a sensor 11. If the IP address or CoA of a group is not blocked, the credit C for each user or client computer 15 in the group can be increased. The credit C for a user or client computer can be used to combine groups together and create bigger groups for users or client computers. In one embodiment, the server computer 12 may not shuffle groups that did not have their IP address or CoA blocked by a censor 11. The server computer 12 can also have a lookup table that can include two columns: group size (G); and risk of each group (R(G)). $R(G_{min})$ equals zero because new users with C=0 should be assigned to groups with size $G_{min}$. If a big group (i.e., G is large) is blocked by a sensor 11, the server computer 12 can divide the blocked group it to two (or more) smaller groups. After the next shuffling interval, if one or more of the smaller groups are still blocked, each group can be further divided into two (or more) even smaller groups by the server computer 12. The blocked IP address determination process can be continued by the server computer 12 until the groups reach the minimum group size $G_{min}$ and the censor is identified.

The risk of a group R(G) corresponds to the maximum cost of having a censor in the group. For example, assume that $G_{min}=2$ and there is a group of 8 users or client computers 15 with one of the users being a censor 11 (who has just started to block the CoA). In the worst case, the censor 11 can block 7 innocent users for one shuffling interval. Then, since the CoA was blocked, the censor 11 can be assigned to a group of 4 users and can only block 3 innocent users and after that the censor 11 can be assigned to the minimum group size ($G_{min}=2$). Thus, the cost of having the censor 11 in a group of 8 users can be determined. The determined cost can be used as the risk of groups.

In one embodiment, the size of the lookup table stored by the server computer 12 may not be large. For example, if $G_{min}=100$ and the maximum group size ($G_{max}$) equals 1,638,400, then the number of rows in the table is equal to $\log_2(1638400/100)=14$ rows. A table of 14 rows can be small enough for quick searches to find a suitable group for a user with an specific credit.

In another embodiment, a censor 11 may pretend to be innocent to be placed in a bigger group before the censor 11 starts blocking users. To make it expensive for censors 11, a credit (C) of a user should be more than twice the risk of group (R(G)) in order to put the user in the group G. If the server computer 12 detects that the IP address or CoA of group C is blocked by a censor 11, the server computer 12 can divide the group to two groups and decrease the credit of each user. The credit C for a user can start at zero and increase until the credit is twice $G_{max}$. After some time, big groups of innocent users (which may include censors that are not blocking the IP address) can form and the server computer 12 is not shuffling the IP addresses or CoAs of the groups. In addition, there may be some small groups that include active censors 11 that are blocking innocent users, but they are not in the same group with a large number of innocent users. The server computer 12 can repeat the process of making smaller groups if a censor 11 is detected until the server computer 12 can identify the censor 11.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A method for communicating with a plurality of client computers over a network, the method comprising:
   arranging, by a server computer, the plurality of client computers into a first plurality of groups, wherein each group of the first plurality of groups includes at least one client computer and at least one group of the first plurality of groups includes a censor computer;
   generating, by the server computer, a plurality of first IP addresses used to identify the server computer;
   assigning, by the server computer, a first IP address of the plurality of first IP addresses to each group of the first plurality of groups;
   providing, by the server computer, the assigned first IP address for a corresponding group to each client computer of the corresponding group, wherein the at least one client computer in the at least one group including the censor computer is prevented from communicating with the server computer by the censor computer; and
   after a predetermined interval has elapsed, arranging the plurality of client computers into a second plurality of groups, wherein the second plurality of groups is different from the first plurality of groups and the at least one client computer prevented from communicating with the server computer is in a different group of the second plurality of groups from the censor computer, generating a plurality of second IP addresses, assigning a second IP address of the plurality of second IP addresses to each group of the second plurality of groups and providing the assigned second IP address for a corresponding group to each client computer of the corresponding group thereby permitting the at least one client computer previously prevented from communicating with the server computer by the censor computer to communicate with the server computer.

2. The method of claim 1, wherein the providing the assigned first IP address for a corresponding group to each client computer includes:
sending a binding update message with the assigned first IP address to each client computer; and
receiving, by the server computer, a binding acknowledgement message from each client computer.

3. The method of claim 2, further comprising storing a prior assigned IP address for each client computer upon the generation of the plurality of first IP addresses.

4. The method of claim 3, further comprising removing the stored prior assigned IP address for a client computer in response to the receipt of the binding acknowledgement message from the client computer.

5. The method of claim 1, wherein the first plurality of groups includes a predetermined number of groups based on the plurality of client computers.

6. The method of claim 1, wherein the arranging the plurality of client computers into the first plurality of groups includes grouping the plurality of client computers based on a corresponding location of a client computer.

7. The method of claim 1, further comprising determining, by the server computer, if an assigned first IP address for a group is being blocked by a censor computer.

8. The method of claim 1, further comprising executing a registration process to add a new client computer to the plurality of client computers.

9. The method of claim 8, wherein the executing a registration process includes sending a packet to the server computer by the new client computer, the packet including an IP address for the new client computer and key information.

10. The method of claim 9, wherein the executing a registration process includes completing a challenge puzzle by a user at the new client computer before sending the packet to the server computer.

11. The method of claim 1, wherein generating the second plurality of IP addresses includes, for each second IP address, making a first portion of the second IP address identical to a first portion of a corresponding first IP address and randomly generating a second portion of the second IP address.

12. The method of claim 1, wherein the first plurality of groups and the second plurality of groups include a predetermined number of groups and the predetermined number of groups is based on a total number of the plurality of client computers.

13. The method of claim 1, wherein the predetermined interval varies between a maximum time period and a minimum time period based on activity at the server computer.

14. The method of claim 1, further comprising identifying a censor computer, by the server computer, by performing behavior monitoring on the plurality of client computers.

15. A method for communicating with a plurality of client computers over a network, the method comprising:
arranging, by a server computer, the plurality of client computers into a plurality of groups, wherein each group includes at least one client computer;
generating, by the server computer, a plurality of IP addresses used to identify the server computer;
assigning, by the server computer, an IP address of the plurality of IP addresses to each group of the plurality of groups;
providing, by the server computer, the assigned IP address for a corresponding group to each client computer of the corresponding group;
determining, by the server computer, if an assigned IP address for a group is being blocked by a censor computer;
grouping the client computers in the group with the assigned IP address blocked by the censor computer into two or more smaller groups;
generating a unique IP address to identify the server computer for each of the smaller groups;
providing the corresponding unique IP address for a smaller group to each client computer in the smaller group; and
determining if the unique IP address for a smaller group is being blocked by the censor computer.

16. The method of claim 15, further comprising repeating the grouping the client computers, the generating a unique IP address, the providing the corresponding unique IP address and the determining if the unique IP address for a smaller group is being blocked until the censor computer is identified.

17. A server computer comprising:
a communication interface to communicate with a plurality of client computers via a network;
a processing unit coupled to the communication interface and configured to execute instructions; and
a memory having the instructions stored thereon and coupled to the processing unit to provide the instructions to the processing unit, wherein the instructions cause the processing unit to:
arrange the plurality of client computers into a first plurality of groups, wherein each group of the plurality of groups includes at least one client computer and at least one group of the plurality of groups includes a censor computer;
generate a plurality of first care-of addresses used to identify the server computer;
assign a first care-of address of the plurality of first care-of addresses to each group of the first plurality of groups;
provide the assigned first care-of address for a group to each client computer of the corresponding group, wherein the at least one client computer in the at least one group including the censor computer is prevented from communicating with the server computer by the censor computer; and
after a predetermined interval has elapsed, arranging the plurality of client computers into a second plurality of groups, wherein the second plurality of groups is different from the first plurality of groups and the at least one client computer prevented from communicating with the server computer is in a different group of the second plurality of groups from the censor computer, generating a plurality of second care-of addresses, assigning a second care-of address of the plurality of second care-of addresses to each group of the second plurality of groups and providing the assigned second care-of address for a group to each client computer of the corresponding group thereby permitting the at least one client computer previously prevented from communicating with the server computer by the censor computer to communicate with the server computer.

18. The server computer of claim 17, wherein the plurality of first care-of addresses and the plurality of second care-of addresses are different from a home address assigned to the server computer.

19. The server computer of claim 17, wherein the instructions cause the processing unit to send a packet to a client computer without a destination option header or a type 2 routing header.

20. The server computer of claim 17, wherein the instructions cause the processing unit to utilize a binding update procedure to provide the assigned first care-of address to the client computers.

21. The server computer of claim 20, wherein the instructions cause the processing unit to store prior assigned care-of addresses provided to the client computers until the binding update procedure is completed.

22. The server computer of claim 17, wherein the instructions cause the processing unit to send a packet to a client computer using Internet Protocol Security with Internet Key Exchange.

23. The server computer of claim 17, wherein the instructions cause the processing unit to determine if an assigned care-of address for a group is being blocked by a censor computer.

24. The server computer of claim 23, wherein the instructions cause the processing unit to identify the censor computer using the blocked assigned care-of addresses.

* * * * *